United States Patent
Tsukamoto et al.

[11] Patent Number: 5,818,898
[45] Date of Patent: Oct. 6, 1998

[54] X-RAY IMAGING APPARATUS USING X-RAY PLANAR DETECTOR

[75] Inventors: Akira Tsukamoto; Masayuki Nishiki; Seiichiro Nagai; Koichiro Nabuchi; Tohru Saisu, all of Otawara; Shin-ichi Yamada, Tochigi-ken; Takayuki Tomisaki, Otawara; Manabu Tanaka, Yokohama, all of Japan

[73] Assignee: Kabushiki Kaisha Toshiba, Kawasaki, Japan

[21] Appl. No.: 744,937

[22] Filed: Nov. 6, 1996

[30] Foreign Application Priority Data

Nov. 7, 1995 [JP] Japan .................................. 7-288676
Nov. 27, 1995 [JP] Japan .................................. 7-307544

[51] Int. Cl.⁶ ...................................................... A61B 6/03
[52] U.S. Cl. ........................................ 378/98.8; 250/370.09
[58] Field of Search ..................... 378/98.8; 250/208.1, 250/370.09, 370.11, 580

[56] References Cited

U.S. PATENT DOCUMENTS

| | | |
|---|---|---|
| 4,689,487 | 8/1987 | Nishiki et al. . |
| 4,827,145 | 5/1989 | Arques .................................. 378/98.8 |
| 4,991,192 | 2/1991 | Nishiki . |
| 5,101,421 | 3/1992 | Nishiki . |
| 5,262,649 | 11/1993 | Antonuk et al. . |
| 5,583,905 | 12/1996 | Nishiki et al. .................. 378/98.8 |

*Primary Examiner*—David P. Porta
*Attorney, Agent, or Firm*—Oblon, Spivak, McClelland, Maier & Neustadt, P.C.

[57] ABSTRACT

An X-ray imaging apparatus comprises an X-ray emission unit for emitting X-rays onto a human body under examination, an X-ray emission control unit for outputting an X-ray emission signal to direct the X-ray emission unit to emit X-rays, a flat panel X-ray detector having a two-dimensional array of detector elements in rows (lines) and columns, each of the detector elements converting incident X-rays passed through the human body under examination into an electric charge signal and storing it, a resetting unit for placing each line of the detector elements in the readout state in sequence, thereby discharging electric charge stored on each of the detector elements, a storage unit for placing all the lines of the detector elements in the readout state to thereby allow each of the detector elements to store an electric charge signal, and a readout unit for placing each line of the detector elements in the readout state in sequence to thereby read an electric charge signal from each of the detector elements.

21 Claims, 10 Drawing Sheets

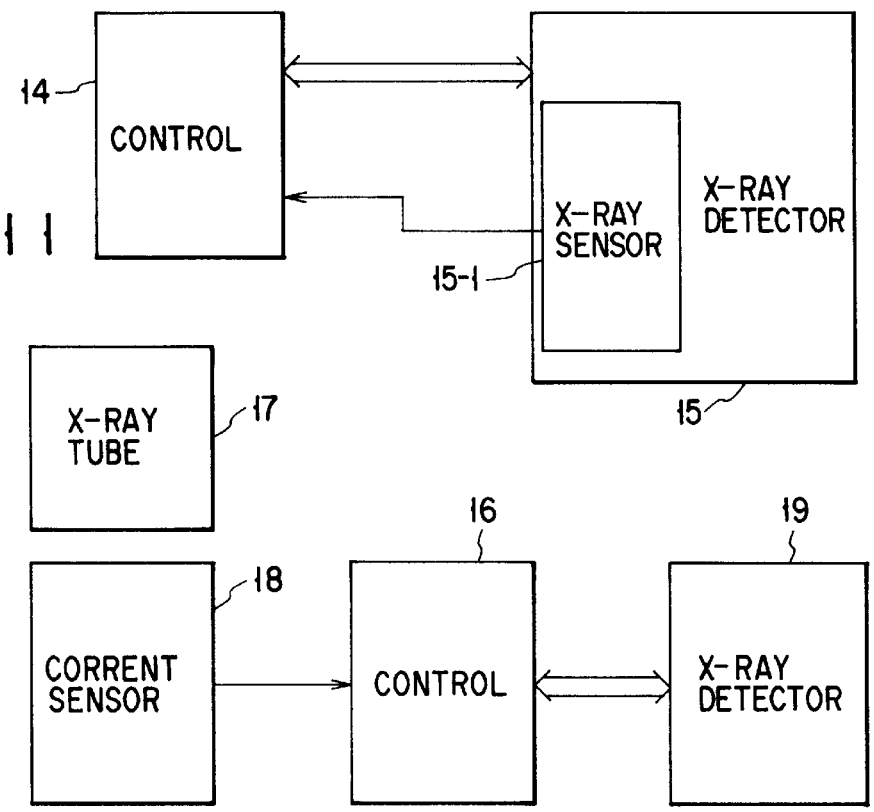
FIG. 11
FIG. 12
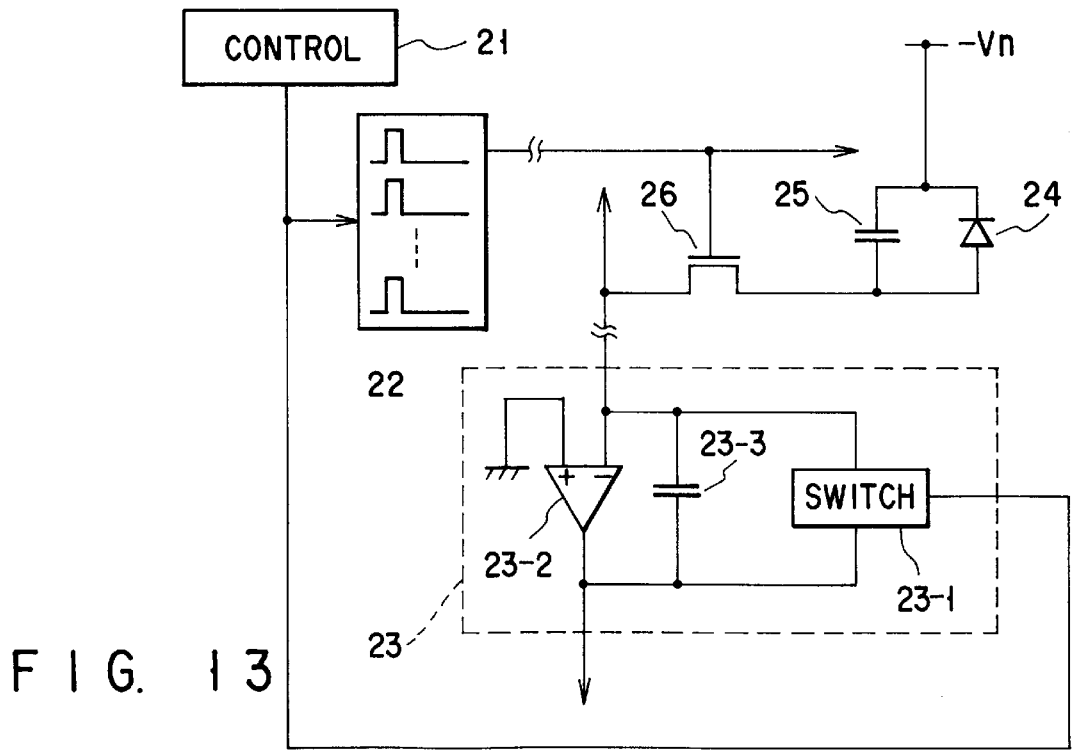
FIG. 13

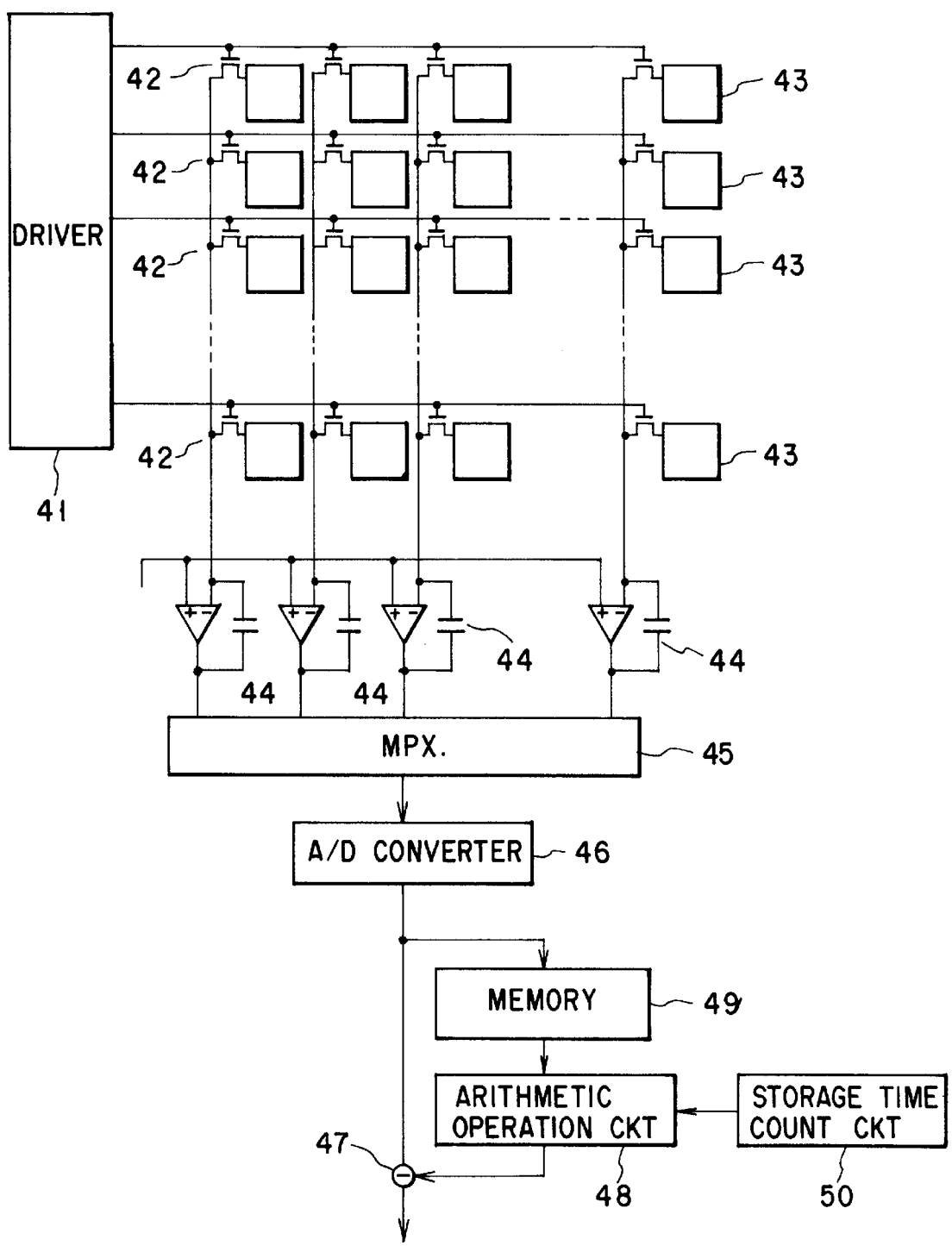
F I G. 16

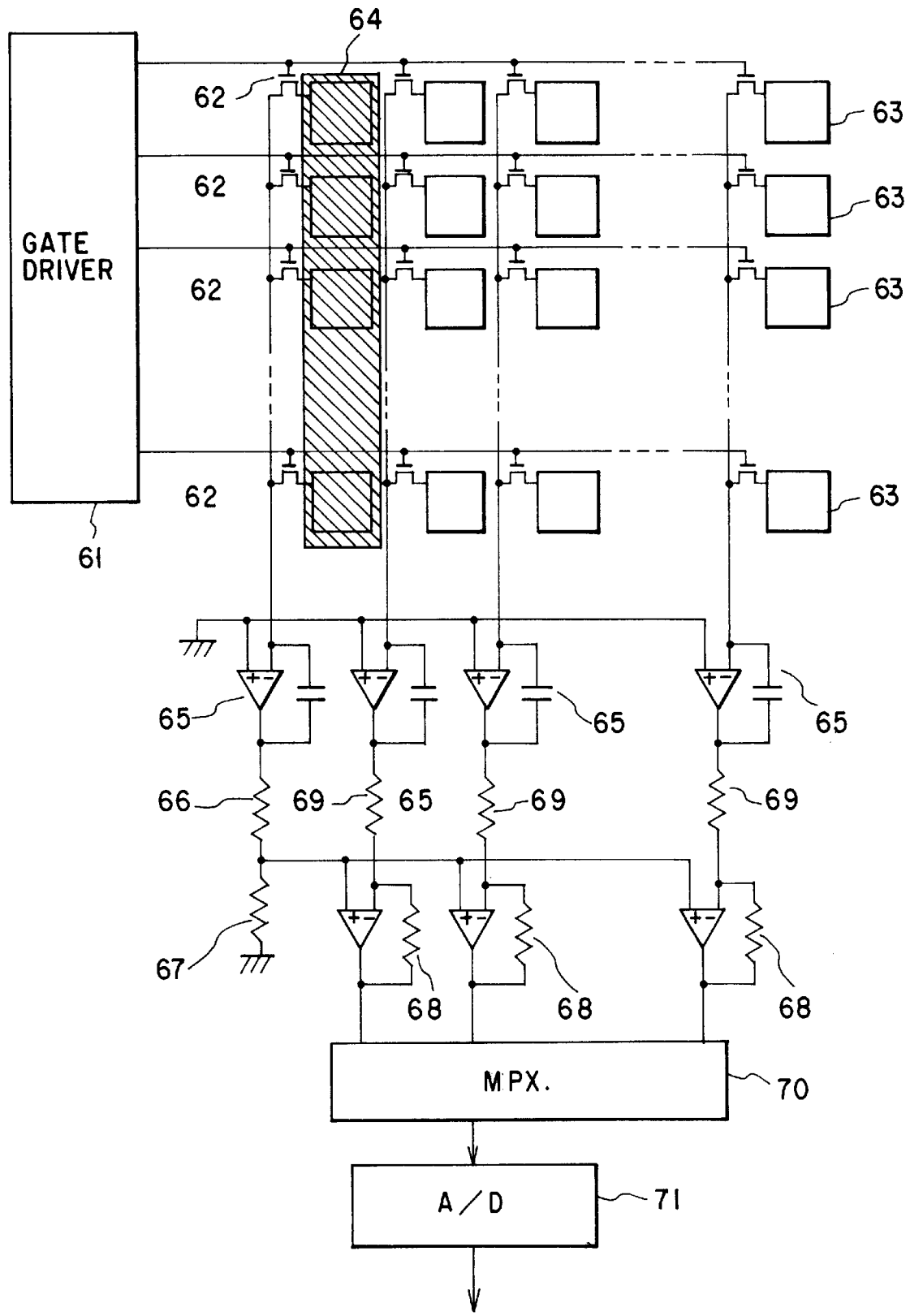
F I G. 17

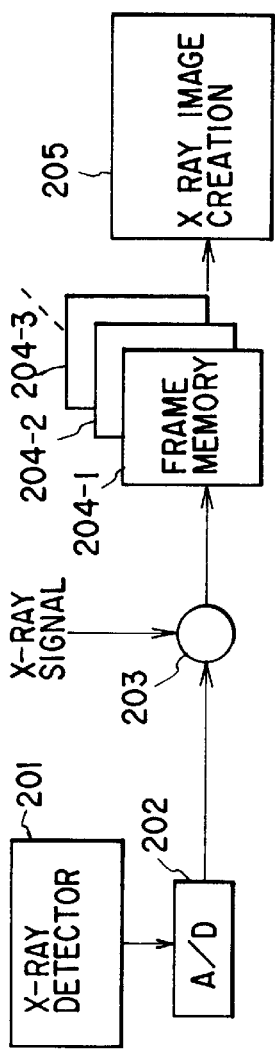
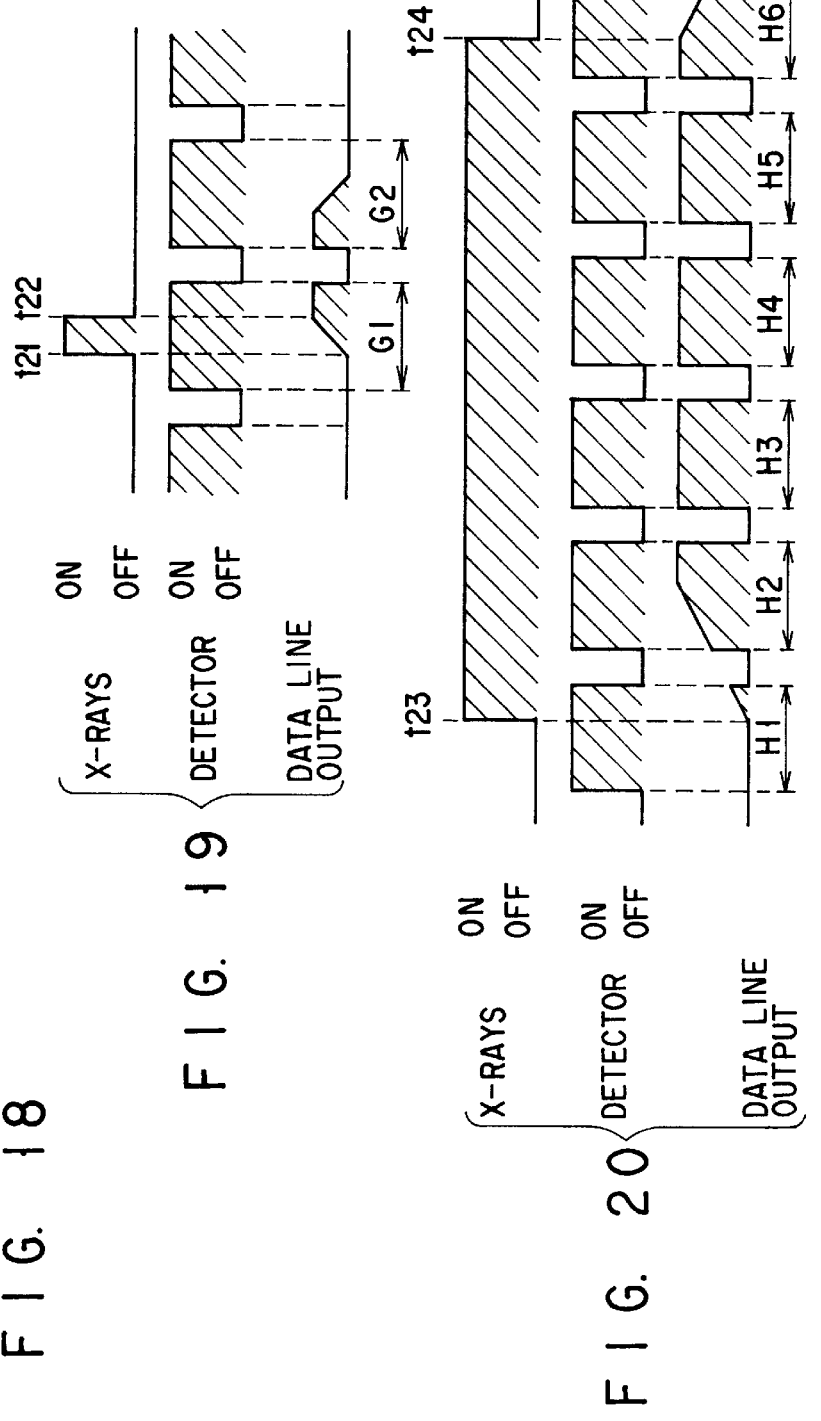

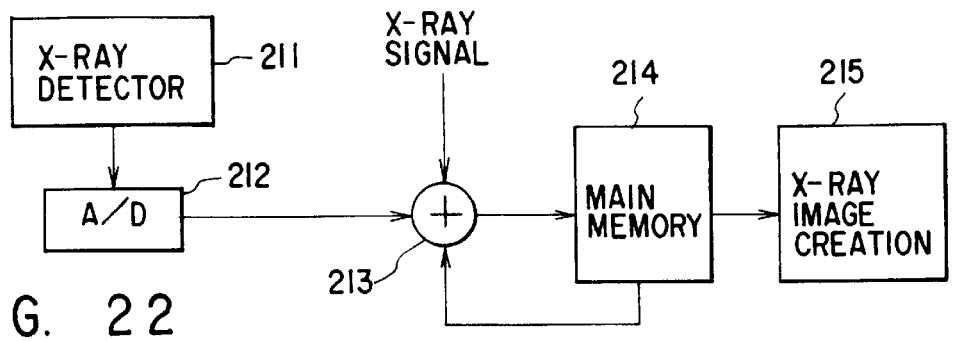
F I G. 22
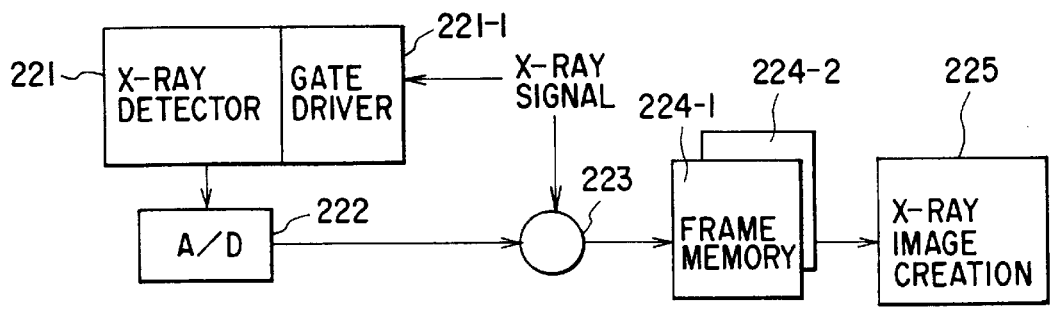
F I G. 23
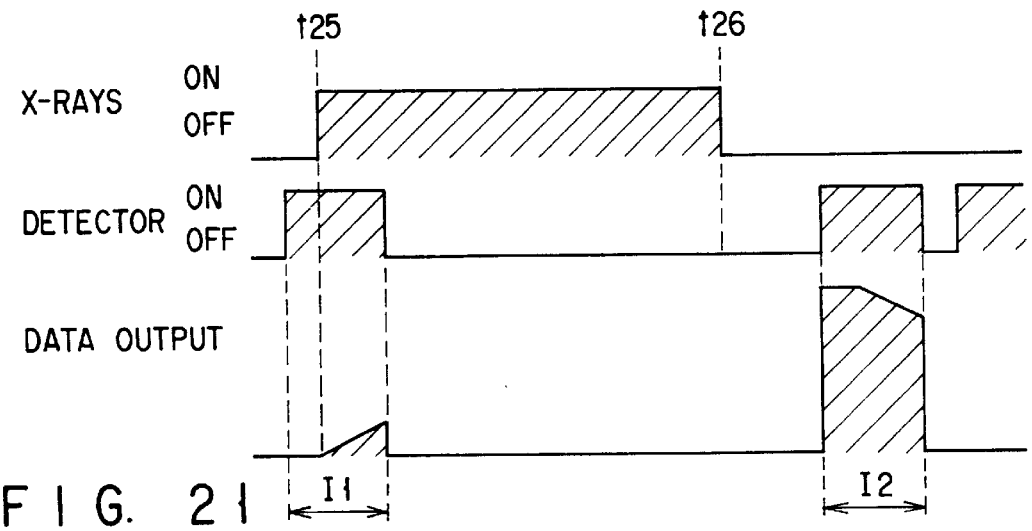
F I G. 21
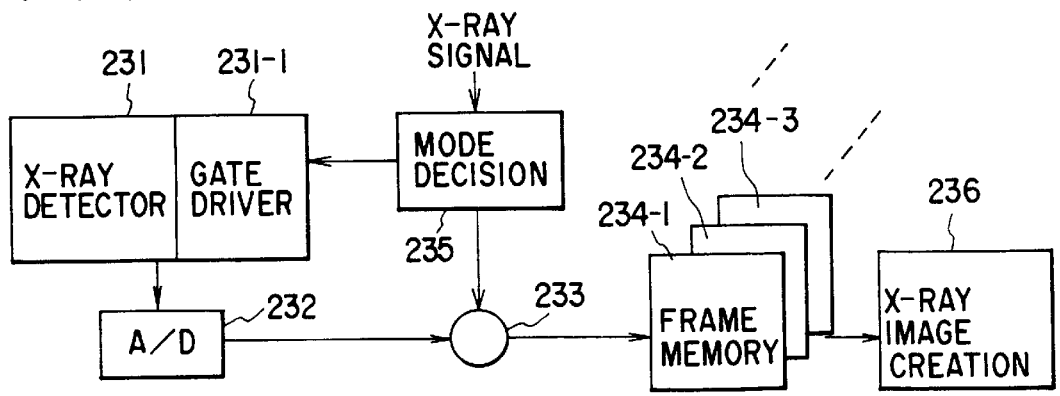
F I G. 24

X-RAY IMAGING APPARATUS USING X-RAY PLANAR DETECTOR

BACKGROUND OF THE INVENTION

1. Field of the Invention

The invention relates to an X-ray imaging apparatus using a flat panel X-ray detector.

2. Description of the Related Art

Flat panel X-ray detectors, which have an advantage of being capable of digitally X-ray imaging a human body under examination in real time, include (1) direct conversion detectors which convert incident X-rays directly into the electric charges and obtain electric signals and (2) indirect conversion planar detectors which convert incident X rays into light, convert the light into electric charges, and convert the electric charges into electric signals. An example of an indirect detector is disclosed in U.S. Pat. No. 4,689,487.

In FIG. 1, there is illustrated a conventional X-ray imaging apparatus using a flat panel X-ray detector. A human body 102 under examination is irradiated with X-rays emitted from an X-ray tube 101 and X-rays transmitted through the human body are directed onto a flat panel X-ray detector 103. The flat panel X-ray detector 103 comprises a two-dimensional array of detector elements each of which forms a picture element (pixel). Signals are output from the detector 103 on a pixel-by-pixel basis and then formed into an image by a camera controller 104 including a television (TV) camera. The resulting image is displayed on a TV monitor 105.

As shown in FIG. 2, each detector element comprises a photodiode 111 which generates electric charges corresponding to the amount of incident light, a capacitor (hereinafter referred to as a storage capacitor) 112 for storing the charges from the photodiode, and a thin-film transistor (TFT) 113 serving as a switch used to read the charges stored on the storage capacitor.

The cathode of the photodiode 111 and one plate of the storage capacitor 112 are connected together to a reverse-bias power supply (−Vn), while the anode of the photodiode and the other plate of the storage capacitor are connected together to the source of the TFT 113.

Using each of the detector elements as one element, the flat panel X-ray detector 103 is constructed such that the elements are arranged in columns and rows (lines) to form a two-dimensional array. The gates of the respective TFTs 113 arranged in one line are connected together to a corresponding line output terminal of a gate driver 106.

From the line output terminals of the gate driver 106 control pulse signals which are output in time sequence. Each of the TFTs 113 arranged in the same line is turned ON simultaneously by a corresponding control pulse signal. On the other hand, each of the TFTs arranged in the different lines is turned ON in time sequence.

The drains of the respective TFTs 113 arranged in each column are connected together through an integration circuit which includes a readout amplifier 107, a capacitor (hereinafter referred to as a time-constant capacitor) 108, and a reset switch 109, to a corresponding one of input terminals of a multiplexer 110.

The multiplexer 110 is arranged to, during the duration of one pulse output from each line output terminal of the gate driver 106, sequentially provide signals applied to its inputs, one at a time, to its output.

Thus, when the TFTs arranged in one line are turned ON simultaneously by a control pulse signal output from a corresponding line output terminal of the gate driver 106, charges stored on the storage capacitors 112 are output through the corresponding respective TFTs 113 and then converted to voltages through the respective corresponding integration circuits. These voltages are sequentially output from the multiplexer 110 one at a time (on a pixel-by-pixel basis). When the readout of one line is terminated in this manner, the readout of the next line is initiated. That is, like scanning lines of a television picture, the detector elements are sequentially read one at a time (pixel by pixel) for each line, whereby image data (a video signal) for one frame is output.

As shown in FIG. 3, a fluorescent layer that converts X rays to light is formed over the two-dimensional array of the detector elements. That is to say, a gate electrode 122 is formed in each TFT region on a substrate 121 and an SiNx layer 123 is formed on the gate electrode 122. In the TFT region, an a-Si layer 124, a drain electrode 125 and a source electrode 126 are formed on the SiNx layer 123. The drain electrode 125 and the source electrode 126 are connected by the a-Si layer 124, not directly. In the gaps between the drain electrode 125 and the a-Si layer 124 and between the source electrode 126 and the a-Si layer 124 are formed n+a-Si layers 127 and 128. Thus, a TFT is formed in the TFT region.

In each PD (photodiode) region on the substrate 121 an $n^+$-type layer 129, an intrinsic (i-type) layer 130 and a $p^+$-type layer 131 are formed on the SiNx layer 123 and the source electrode 126 form a photodiode 111 of the p-i-n structure.

A first polyimide layer 132 is formed over each TFT, and a transparent electrode 133 is formed over each photodiode 111. A metal electrode 134 is formed over the first polyimide layer 132 to connect the transparent electrodes 133 of the neighboring photodiodes together.

A second polyimide layer 135 is formed over the transparent electrode 133 and the metal electrode 134. A transparent protection layer 136, a fluorescent layer 137 and a light reflection layer 138 are formed over the second polyimide layer 135.

The method of obtaining an X-ray image will be described next. X-rays transmitted through a human body under examination are directed through the light reflection layer 138 onto the fluorescent layer 137. At this point, incident visible light is reflected by the light reflection layer 138; it is prevented from falling on the fluorescent layer 137.

By the fluorescent layer 137 the energy of incident X-rays is converted to the energy of visible light, which passes through the transparent protection layer 136, the second polyimide layer 135, and the transparent electrode 133 and is then received by the photodiode 111 that is sensitive to visible light.

The visible light is converted by the photodiode 111 to an electric charge, the amount of which is proportional to the energy of the visible light. The charge is stored on the storage capacitor 112. The stored charge is read out pixel by pixel for each line as described previously. The read signal is proportional to the energy of incident X-rays. By reconstructing signals read pixel by pixel, an X-ray image can be obtained.

With the flat panel X-ray detector 103, however, noise charge, based on dark current will be stored on the storage capacitor 112 in the detector when X-rays are not emitted. For this reason, the amount of signal charge which will be stored on the storage capacitor by the photodiode 111 will be restricted. In order to achieve a wide dynamic range, it is required to read the detector elements constantly regardless of the presence or absence of incidence of X-rays or to perform a single read operation on the detector elements immediately before the emission of X-rays, thereby draining the noise charge stored on the storage capacitor.

However, in order to read the detector elements constantly, it is required to time the emission of X-rays with respect to the read period; otherwise, X-rays cannot be emitted at a desired time. This will result in poor operability.

When the emission of-X rays is timed with respect to the read period, there arises the possibility that a human body under examination may be irradiated with an insufficient amount of X-rays. In this case, an X-ray image poor in quality will be obtained.

On the other hand, with the method by which dark current noise is drained off pixel by pixel for each line prior to the emission of X-rays, a time is required between the moment that an operator decides to emit X-rays and the moment that he or she completes preparations. Thus, X-rays cannot be emitted immediately.

There are two methods of timing the emission of X-rays and the readout of data from the flat panel X-ray detector.

The first method is to, in the case of one-shot imaging as shown in FIG. 4A, emit X-rays in a state where the flat panel X-ray detector is disabled against data readout and enable the detector for data readout at the same time the emission of X-rays is terminated.

Strictly speaking, the data line output of FIG. 4A comprises signals each of which corresponds to stored charge on a respective one of pixels (detector elements) and is output in a sequential order of time. For simplicity, they are shown continuously.

The second method is to, as shown in FIG. 4B, provide blanking intervals during which time the driving of the X-ray detector is stopped as in normal video signals and emit X-rays during each blanking interval where the X-ray detector is continuously driven at regular intervals.

According to the first method, X-rays can be emitted at any time. However, it is required to adjust the timing of driving of the flat panel X-ray detector to the timing of emitting of X-rays.

With the second method, it is not required to control the timing of driving of the flat panel X-ray detector. However, it is required to control the timing of emitting of X-rays to the blanking interval of the flat panel X-ray detector. And moreover, the X-ray emission must be performed during the blanking interval.

SUMMARY OF THE INVENTION

A first object of the invention is to provide an X-ray imaging apparatus which has its operability improved and reduces the effect of dark current noise so that a good X-ray image is produced.

A second object of the invention is to provide an X-ray imaging apparatus which permits X rays to be emitted during a desired time interval at any time and permits a good X-ray image to be produced.

The first object is achieved by an X-ray imaging apparatus comprising: X-ray emission means for emitting X-rays onto a human body under examination; X-ray emission control means for outputting an X-ray emission signal to direct the X-ray emission means to emit X-rays; a flat panel X-ray detector having a two-dimensional array of detector elements in rows (lines) and columns, each of the detector elements converting incident X-rays passed through the human body under examination into an electric charge signal and storing it; readout control means for controlling readout of electric charges stored on the detector elements of the flat panel X-ray detector on a line-by-line basis, the control means performing operations of first repeating process which plural lines of the detector elements of X-ray flat panel X-ray detector in the readout state in the same time to thereby discharge electric charges stored on the detector elements, then placing all the lines of the detector elements in the nonreadout state to thereby allow each of the detector elements to store an electric charge signal, and finally placing each line of the detector elements in the readout state in sequence to thereby allow an electric charge signal stored on each of the detector elements to be read.

According to the invention, by simultaneously discharging dark current noise charge stored on the storage capacitors in the detector elements associated with all the lines or several lines in synchronism with the emission of X-rays, the dark current noise charge discharging time can be reduced significantly and X-ray imaging can be performed at a desired time.

The second object is achieved by an X-ray imaging apparatus comprising: X-ray emission means for emitting X-rays onto a human body under examination; X-ray emission control means for outputting an X-ray emission signal which directs the X-ray emission means to emit X-rays; a flat panel X-ray detector having a two-dimensional array of detector elements in rows (lines) and columns, each of the detector elements converting incident X-rays passed through the human body under examination into an electric charge signal and storing it; readout means for reading out charge signals from the detector elements in sequence, thereby generating a frame signal representing a frame; and X-ray image producing means for producing an X-ray image by adding frame signals the first of which represents the frame obtained at the start of the emission of X rays and the last of which represents the frame next to the frame obtained at the termination of the emission of X rays.

The second object is also achieved by an X-ray imaging apparatus comprising: X-ray emission means for emitting X-rays onto a human body under examination; X-ray emission control means for outputting an X-ray emission signal which directs the X-ray emission means to emit X-rays; a flat panel X-ray detector having a two-dimensional array of detector elements in rows (lines) and columns, each of the detector elements converting incident X-rays passed through the human body under examination into an electric charge signal and storing it; readout means for reading in sequence from the detector elements all charge signals other than those representing frames the first of which is one next to the frame obtained at the start of the emission of X rays and the last of which is one obtained at the termination of the emission of X rays; X-ray image producing means for adding a frame signal representing the frame obtained at the start of the emission of X rays and frame signals representing the frames obtained after the termination of the emission of X rays.

Moreover, the second object is also achieved by an X-ray imaging apparatus comprising: X-ray emission means for emitting X-rays onto a human body under examination; X-ray emission control means for outputting an X-ray emission signal which directs the X-ray emission means to emit X-rays; a flat panel X-ray detector having a two-dimensional array of detector elements in rows (lines) and columns, each of the detector elements converting incident X-rays passed through the human body under examination into an electric charge signal and storing it; readout means for reading out charge signals from the detector elements in sequence, thereby generating a frame signal representing a frame; mode-selecting means for selecting a first mode or a second mode; and X-ray image producing means for producing an X-ray image by adding frame signals; wherein when the first mode is selected, the readout means reads out charge signals from the detector elements in sequence, thereby generating a frame signal representing a frame, and the X-ray image producing means adds frame signals the first of which represents the frame obtained at the start of the emission of X rays and the last of which represents the frame next to the frame obtained at the termination of the emission of X rays; and when the second mode is selected, the readout means reads in sequence from the detector elements all charge signals other than those representing frames the first of which is one next to the frame obtained at the start of the emission of X rays and the last of which is one obtained at the termination of the emission of X rays, and the X-ray image producing means adds a frame signal representing the frame-obtained at the start of the emission of X rays and frame signals representing the frames obtained after the termination of the emission of X rays.

According to the invention X-rays can be emitted for a desired period of time at any time with the flat panel X-ray detector driven continuously and moreover all effective collected data can be utilized to produce an X-ray image that is good in the signal-to-noise ratio.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

BRIEF DESCRIPTION OF THE DRAWINGS

The accompanying drawings, which are incorporated in and constitute a part of the specification, illustrate presently preferred embodiments of the invention, and together with the general description given above and the details description of the preferred embodiments given below serve to explain the principles of the invention.

FIG. 11 shows in block diagram form a second method of obtaining the timing of X-ray emission in the X-ray imaging apparatus of the third embodiment;

FIG. 12 shows in block diagram form a third method of acquiring the timing of X-ray emission in the X-ray imaging apparatus of the third embodiment;

FIG. 13 shows an arrangement of one detector element and its associated circuit in an X-ray imaging apparatus according to a fourth embodiment of the invention;

FIG. 16 shows a circuit arrangement of a flat panel X-ray detector used in an X-ray imaging apparatus according to a sixth embodiment of the invention;

FIG. 17 shows a circuit arrangement of a flat panel X-ray detector used in an X-ray imaging apparatus according to a seventh embodiment of the invention;

FIG. 18 is a block diagram of the principal part adapted for X-ray image reconstruction in an X-ray imaging apparatus according to an eighth embodiment of the invention;

FIG. 19 shows the timing of X-ray emission the duration of which is shorter than the period of one frame with respect to the operation of the X-ray detector;

FIG. 20 shows the timing of X-ray emission the duration of which is longer than the period of one frame with respect to the operation of the X-ray detector;

FIG. 21 shows the timing of X-ray emission the duration of which is longer than the period of one frame with respect to the operation of the X-ray detector in the tenth embodiment;

FIG. 22 is a block diagram of the principal part adapted for X-ray image reconstruction in an X-ray imaging apparatus according to a ninth embodiment of the invention;

FIG. 23 is a block diagram of the principal part adapted for X-ray image reconstruction in an X-ray imaging apparatus according to a tenth embodiment of the invention; and FIG. 24 is a block diagram of the principal part adapted for X-ray image reconstruction in an X-ray imaging apparatus according to an eleventh embodiment of the invention.

DETAILED DESCRIPTION OF THE PREFERRED EMBODIMENTS

A first embodiment of the invention will be described below with reference to FIGS. 5 through 9.

Figure 5:
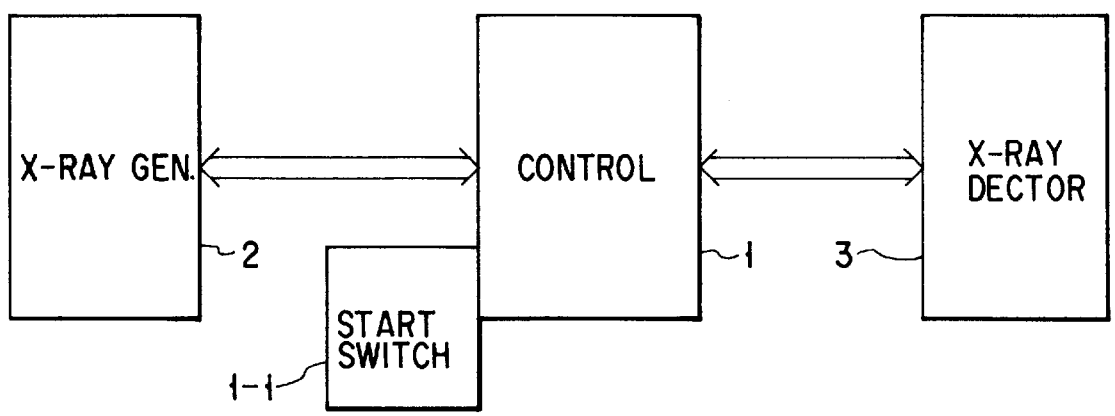
FIG. 5 is a block diagram of an X-ray imaging apparatus according to a first embodiment of the invention.

FIG. 5 is a block diagram of the principal part of an X-ray imaging apparatus embodying the invention. A controller 1 directs an X-ray generator 2, comprised of an X-ray tube, an X-ray tube driver, etc., to emit a desired amount of X-rays to a human body under examination. In addition, the controller 1 controls a flat panel X-ray detector 3 that detects X-rays passed through the human body so as to read electric charge generated and stored in response to incidence of the X-rays on it.

To the controller 1 is connected an emission start switch 1-1 placed on an operating panel not shown, which, when actuated, provides the timing of X-ray emission start to the X-ray generator 2. For easier operation, the start switch 1-1 may be placed in the X-ray generator 2, not the controller 1.

Figure 6:
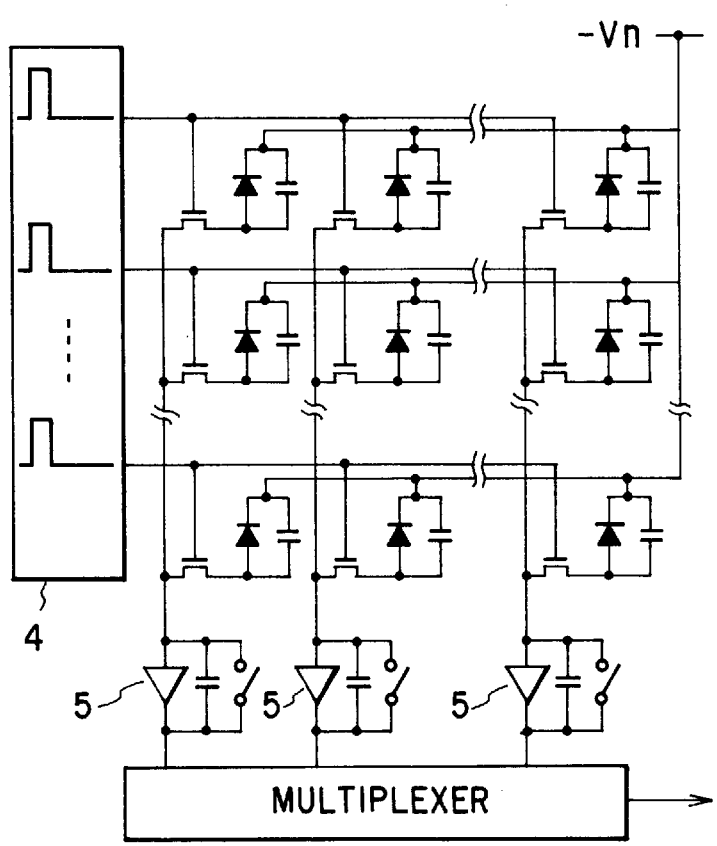
FIG. 6 shows a circuit arrangement of the flat panel X-ray detector in the first embodiment.

FIG. 6 shows a circuit arrangement of the flat panel X-ray detector 3. The detector may be arranged identically to or differently from that described in connection with the background art.

Figure 7:
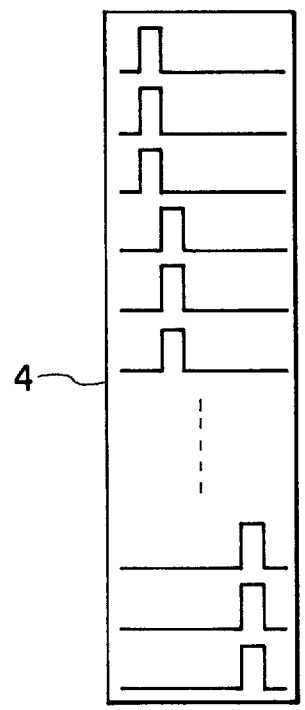
FIG. 7 shows gate drive pulses for the flat panel X-ray detector in the first embodiment.

When supplied with X-ray emission start timing information by the controller 1, a gate driver 4 outputs ON pulses onto all of output lines at the same time so as to drive all the detector elements simultaneously. Alternatively, as shown in FIG. 7, the gate driver 4 may be arranged to output ON pulses at the same time for each line block with the output lines divided into blocks each of several lines (e.g., three lines).

Thus, integration circuits 5, each comprising a readout amplifier and a time-constant capacitor, are arranged to have sufficient current resistance (capacity) to allow stored charges which are simultaneously discharged from the storage capacitors associated with all lines or several lines when TFTs connected to these lines are turned ON to pass therethrough.

Figure 8:
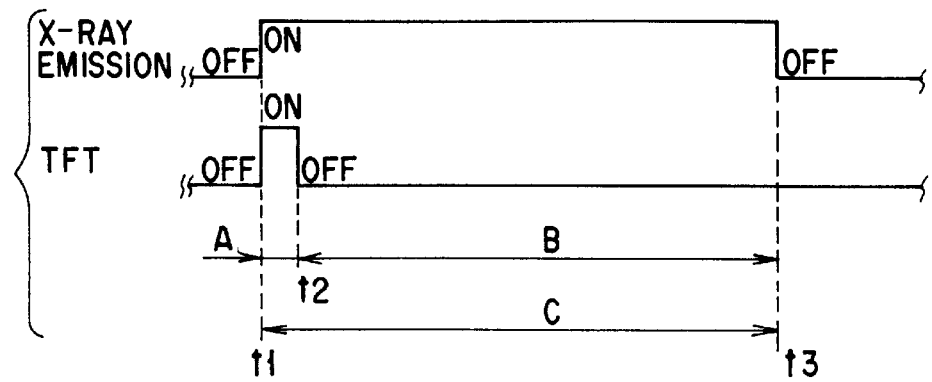
FIG. 8 shows the timing of X-ray emission and the timing of ON/OFF control of a TFT in the X-ray imaging apparatus of the first embodiment.

In the first embodiment thus arranged, an X-ray emission signal and a TFT drive signal are produced at the times as indicated in FIG. 8. The X-ray generator 2 produces the X-ray emission signal, and the controller 1 is responsive to the emission signal to provide information indicative of the timing of X-ray emission to the gate driver 4 in the X-ray detector 3 (time t=t1). In response to the timing information, the gate driver 4 outputs ON pulses at the same time to all the lines or a block of lines as shown in FIG. 7 or 8.

All the TFTs connected to the lines onto which the cm ON pulses are output are turned ON to thereby allow stored charge (dark current noise) on the storage capacitors connected to those TFTs to be discharged to the integration circuits each comprised of readout amplifier and time-constant capacitor. Each integration circuit is arranged such that dark current noise will not be integrated or it will be reset immediately even if dark current noise is integrated. This is intended to have no effect on the integration of stored charges resulting from the exposure to X-rays.

When the discharge of dark current noise stored on the storage capacitors is terminated in that manner, the TFTs are turned OFF (time t=t2), so that the storage capacitors restart the storage of charge resulting from the incidence of X-rays. That is, in FIG. 9, the time interval A from t2=t1 to t=t2 is the noise discharging time, the time interval B from t=2 to t=t3 at which the emission of X-rays is terminated is the imaging time, and the time interval C from t=t1 to t=t3 is the X-ray emission time.

Thus, according to the first embodiment, by simultaneously discharging dark current noise charge stored on the storage capacitors in the detector elements associated with all the lines or several lines in synchronism with the emission of X-rays, the dark current noise charge discharging time can be reduced significantly and X-ray imaging can be performed at a desired time.

A second embodiment of the invention will be described with reference to FIG. 9. The second embodiment uses the same hardware as the first embodiment and hence the description of hardware is omitted here.

Figure 9:
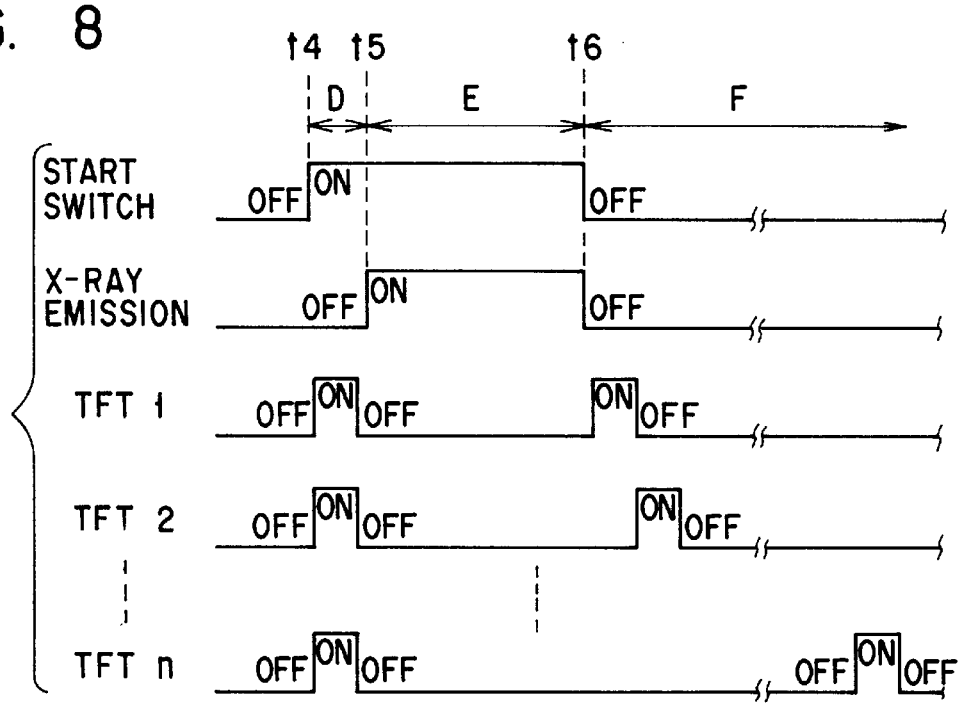
FIG. 9 shows the timing of X-ray emission and the timing of ON/OFF control of TFTs in an X-ray imaging apparatus according to a second embodiment of the invention.

In the second embodiment, the X-ray emission signal and the TFT drive signals are produced at the times as shown in FIG. 9. That is, when an operator turns the emission start switch 1-1 ON (time t=t4), ON pulse signals are output at the same time onto all the lines from the 1st to the n-th line. All the TFTs on these lines are then turned ON, allowing stored charge on the storage capacitors connected to these TFTs to be discharged to the integration circuits.

When the TFTs are turned OFF at the termination of discharge of the dark current noise, the emission of X-rays is started (time t=t5) and charge produced by each photodiode is stored on a respective one of the storage capacitors.

When the operator turns the emission start switch 1-1 OFF (time t=t6), the X-ray emission is terminated and an ON pulse signal is applied to each TFT line in sequence to read the stored charge. The apparatus is arranged to stop the X-ray emission automatically when the X-ray emission time exceeds the preset maximum allowable emission time. In FIG. 9, the time interval D from t=t4 to t=t5 is the noise discharging time, the time interval E from t=t5 to t=t6 is the X-ray emission time, and the time F subsequent to the time t6 is the readout time.

Thus, the second embodiment can provide the same advantages as the first embodiment. In addition, dark current noise charge can be discharged prior to the start of X-ray emission, which helps avoid useless emission of X-rays.

Figure 10:
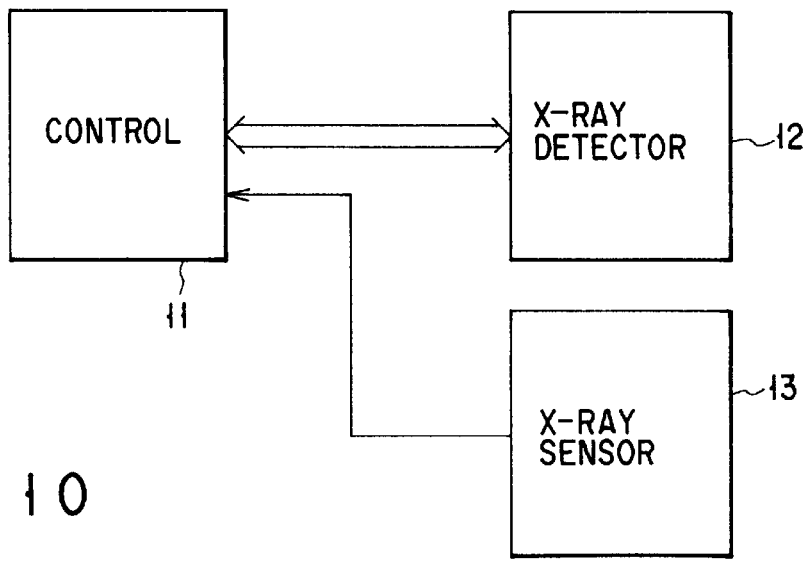
FIG. 10 shows in block diagram form a first method of obtaining the timing of X-ray emission in an X-ray imaging apparatus according to a third embodiment of the invention.

Reference will be made to FIGS. 10 to 12 to describe a third embodiment of the invention. In the first and second embodiments, the controller 1 is directly connected to the X-ray generator 2 so that X-ray emission timing information is directly obtained from the X-ray generator 2. In the third embodiment, on the other hand, the X-ray emission timing information is obtained indirectly from the X-ray generator in a case where the controller is not connected to the X-ray generator. Several methods therefor will be described.

FIG. 10 is a block diagram illustrating a first method of obtaining the timing of X-ray emission. The controller 11 receives an X-ray detection signal output from an X-ray sensor 13 placed on the X-ray receiving surface of the X-ray detector 12 or on the rear side thereof. When placed on the X-ray receiving surface, the X-ray sensor 13 is made of a material that allows X-rays to pass through and placed in a blind portion of the X-ray detector 12. When placed on the rear side of the X-ray detector 12, on the other hand, the X-ray sensor should be one that is highly sensitive to X-rays in order to sense X-rays that leak from the X-ray detector 12.

FIG. 11 is a block diagram illustrating a second method of obtaining the timing of X-ray emission. A controller 14 receives an X-ray detect signal output from an X-ray sensor 15-1 consisting of one detector element at the end of a flat panel X-ray detector 15 or a number of lines arranged in a line.

FIG. 12 is a block diagram illustrating a third method of obtaining the timing of X-ray emission. A controller 16 receives a current detect signal output from a current sensor 18 that senses current flowing through an X-ray tube 17.

Besides the above-described methods, there is a method to directly connect the controller to an X-ray tube for emitting X-rays to a human body to receive an X-ray emission drive signal as an X-ray detect signal.

In the third embodiment thus arranged, the timing of X-ray emission is detected by the X-ray sensor 13, the detector element 15-1, or the current sensor 18 and the resulting X-ray detect signal is applied to the controller 11, 14, or 16. In response to this, the controller provides the X-ray emission timing information to the gate driver of the flat panel X-ray detector. The subsequent operation is the same as that of the first embodiment described previously and the description thereof is omitted here.

Thus, the third embodiment can provide the same advantages as the first and second embodiments.

A fourth embodiment of the invention will be described with reference to FIGS. 13 and 14. FIG. 13 shows an arrangement of one detector element (one pixel) and its associated circuit of an X-ray imaging apparatus embodying the invention. A controller 21 controls a gate driver 22 and a switch 23-1 in an integration circuit 23 in the manner described later. A reverse bias source −V is connected to the anode of a photodiode 24 and one plate of a storage capacitor 25 connected across the photodiode. The point of connection between the cathode of the photodiode 24 and the other plate of the storage capacitor 25 is connected to the source of a TFT 26. The gate driver 22 has gate drive lines connected, each of which is connected to the gates of TFTs 26 arranged in one row. The drains of TFTs 26 arranged in one column are connected by a data signal line to a corresponding one of integration circuits 23, which have their outputs connected to a-multiplexer (not shown). Each of the integration circuits is composed of the above-mentioned switch 23-1, a readout amplifier 23-2, and a capacitor (hereinafter referred to as the time-constant capacitor) 23-3. The readout amplifier 23-2 has its inverting input connected to the drain of the TFT 26. A parallel circuit of the switch 23-1 and the capacitor 23-3 is connected between the inverting input and the output of the readout amplifier 23-3, which has its output connected to ground (0V).

Figure 14:
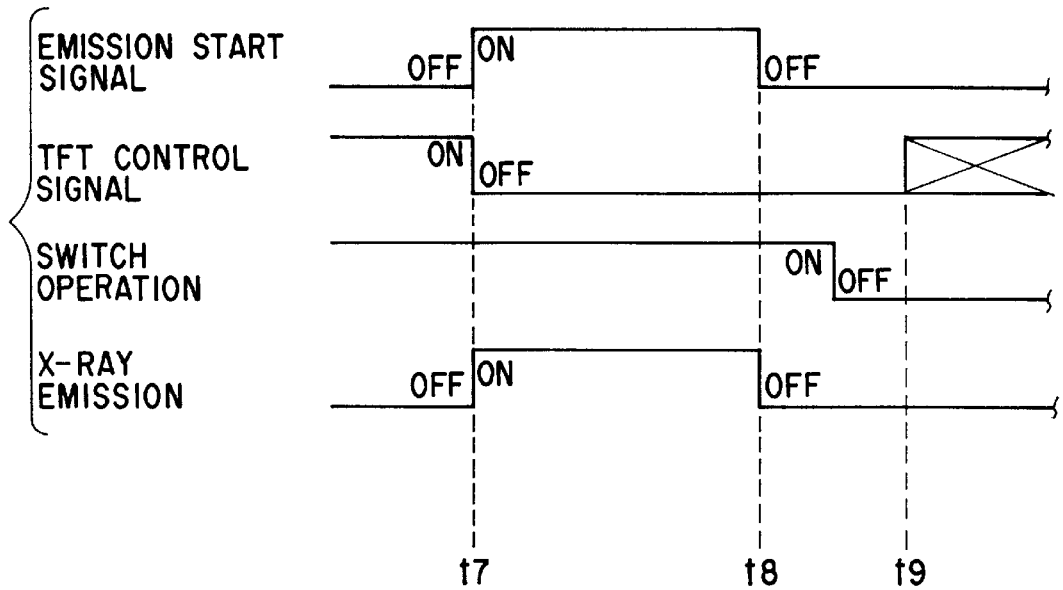
FIG. 14 shows the timing of each of various signals used in the X-ray imaging apparatus of the fourth embodiment.

In the fourth embodiment thus arranged, the control is performed in accordance with the timing as shown in FIG. 14. Until X-rays are emitted (time t=t7), TFT control signals from the gate driver 22 are made positive in potential (ON), thereby rendering the TFTs 26 conductive all the time. Also, the switches 23-1 in the integration circuits are rendered conductive. Thus, dark current noise charge stored on the storage capacitors 25 is drained away through the TFTs 26, the data signal lines, and the integration circuits 23.

When the X-ray emission start signal from the controller 21 next goes ON (time t=t8), the X-ray generator starts the emission of X-rays. At the same time, the gate driver 22 renders the TFT control signals OFF, thereby turning the TFTs 26 OFF.

When the X-ray emission start signal from the controller 21 next goes OFF (time t=t8), the X-ray time interval between the moment that the emission of X-rays is terminated and the moment that the stored charge is read (time t=t9), the switches 23-1 in the integration circuits 23 are turned OFF. At time t=t9 and thereafter, signals are read in sequence.

According to the fourth embodiment thus arranged, since the TFTs 26 are rendered conductive prior to the start of X-ray emission so that dark current noise will not be stored on the storage capacitors 25, charge storage can be initiated simultaneously with the emission of X-rays. Thus, less time is required to discharge stored charge based on dark current noise. X-rays can be emitted less uselessly than in the first, second and third embodiments to perform X-ray imaging in a timely manner.

Figure 15:
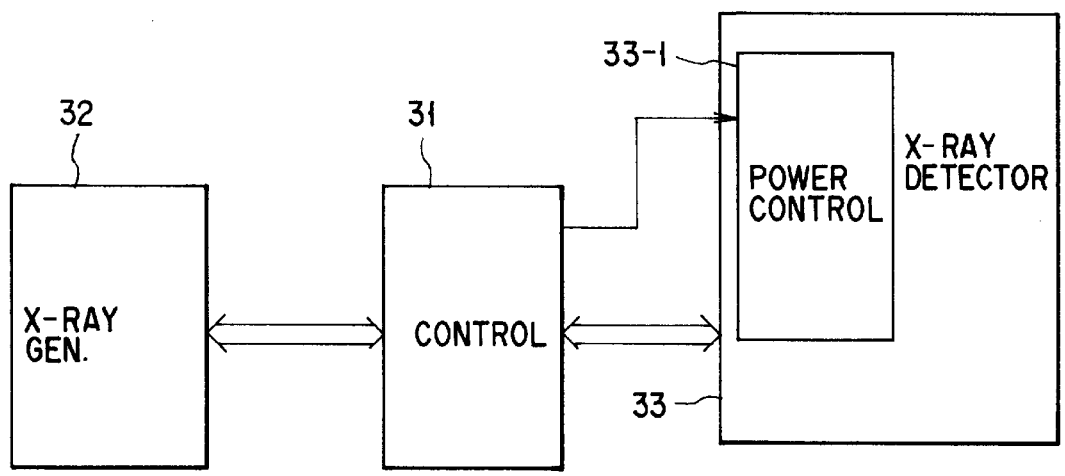
FIG. 15 is a block diagram of the principal part of an X-ray imaging apparatus according to a fifth embodiment of the invention.

A fifth embodiment of the invention will be described with reference to FIG. 15, which illustrates in block diagram the principal part of an X-ray imaging apparatus embodying the invention. As in the first embodiment, a controller 31 controls an X-ray generator 32 and a flat panel X-ray detector 33. Further, the controller 31 controls a power supply control unit 33-1 which controls the supply of electric power to the flat panel X-ray detector 33. That is, as in the fourth embodiment, the power supply to the flat panel X-ray detector 33 (storage capacitors in particular) is cut off prior to the emission of X-rays. At the time of emitting X-rays, the power supply to the X-ray detector 33 is initiated.

Thus, the fifth embodiment can provide the same advantages as the fourth embodiment.

Figure 1:
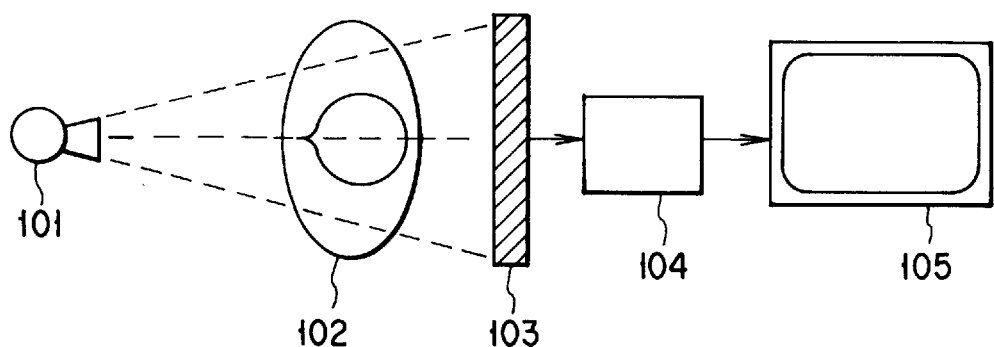
FIG. 1 is a schematic representation of a conventional X-ray imaging apparatus using a flat panel X-ray detector.
Figure 2:
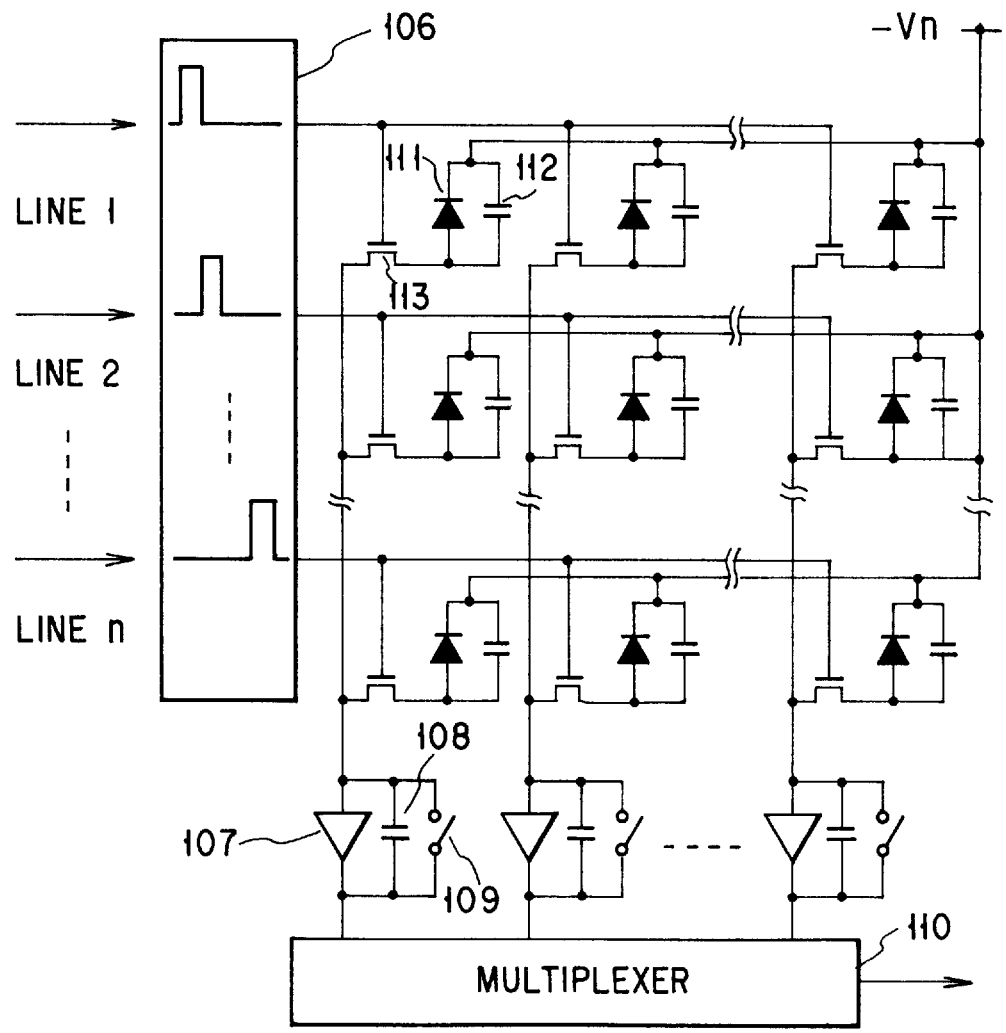
FIG. 2 shows a circuit arrangement of the flat panel X-ray detector of FIG. 1.
Figure 3:
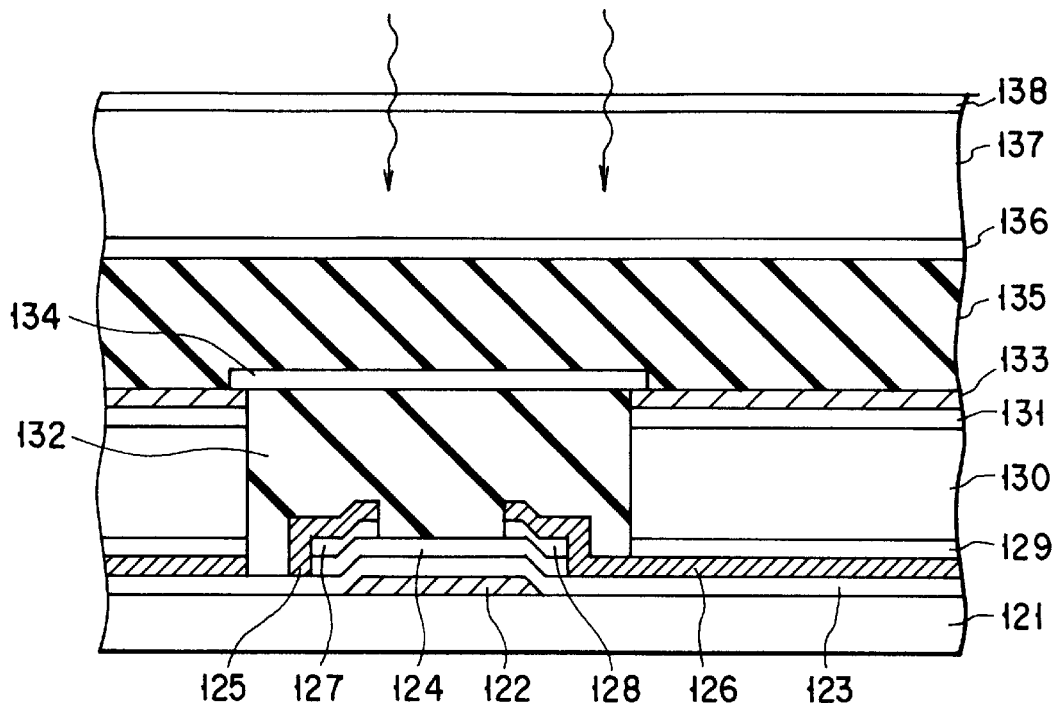
FIG. 3 is a sectional view of the structure of a detector element of the flat panel X-ray detector fabricated using semiconductor technologies.
Figure 4A:
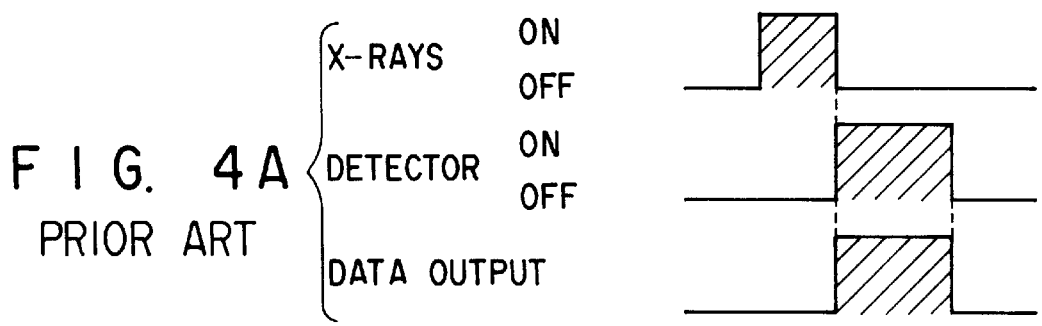
FIGS. 4A and 4B are timing diagrams showing relationships in time between the emission of X-rays and the driving of the flat panel X-ray detector in the conventional X-ray imaging apparatus.
Figure 4B:
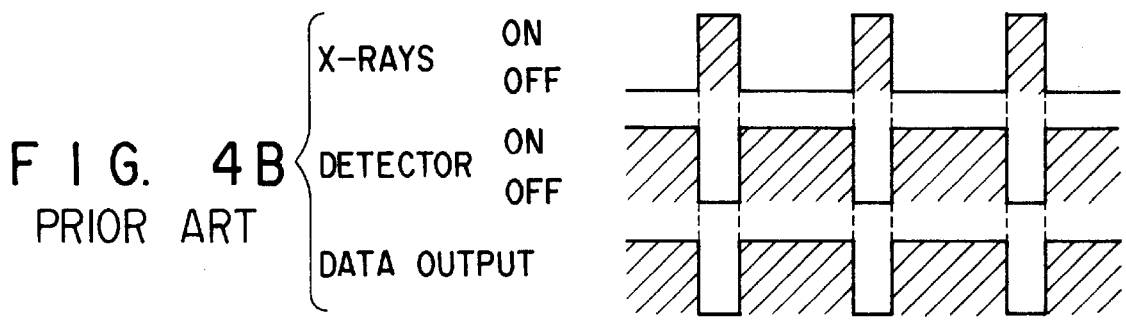

A sixth embodiment will be described next with reference to FIG. 16, which shows a circuit arrangement of a flat panel X-ray detector. The flat panel X-ray detector is distinct from the detector described in connection with the first embodiment (see FIG. 2) in that a shading compensation circuit is provided for eliminating dark current noises (including other noises such as fixed pattern noises) from a serial signal output from a multiplexer. That is, after X-rays have been emitted, a gate driver 41 outputs TFT control signals in a sequential order of time, each of which renders TFTs 42 arranged in a corresponding line conductive simultaneously. Then, charges stored by the emission of X-rays are read pixel by pixel, line by line from the detector elements connected to the TFTs. As described previously, each detector elements consists of a photodiode and a storage capacitor. The charges that have been read simultaneously from the detector elements arranged in a line are applied to the respective inputs of a multiplexer 45 through integration circuits 44 each of which comprises a readout amplifier and a time-constant capacitor (a switch to discharge (reset) charge stored on the capacitor is omitted for the purpose of simplifying the illustration). The multiplexer 45 sequentially delivers the outputs of the respective integration circuits 33 to its output to thereby providing a serial signal, which is in turn applied to an A/D converter 46. In the A/D converter 46, the analog serial signal is converted to a digital form. The digital output data is applied to a subtracter 47 which is connected to receive shading compensation data (noise quantity data) from an operations processing circuit 48. To the operations processing circuit are connected a memory 49 which stores data on noise quantity per unit time for each detector element (pixel) and a storage time count circuit 50 which, for each line, counts the storage time that elapses after the readout of the last X-ray image. Thus, the operations processing circuit is supplied with the data on noise quantity per unit time for a corresponding detector element from the memory and the storage time data for a corresponding line from the storage time count circuit 50. Thus, the operations circuit 49 calculates the quantity of stored noise contained in the digital signal on the basis of the quantity of noise per unit time from the memory 48 and the storage time from the storage time count circuit 50. The resulting noise quantity data is applied to the subtracter 47 as shading compensation data. The subtracter 47 subtracts the stored noise quantity data from the digital data from the A/D converter. The memory 48 is connected to the A/D converter 46 so that it is preset with data on noise quantity per unit time.

In the sixth embodiment thus arranged, the memory 49 has been stored with data on the quantity of noise per unit time for each detector element. For example, after dark current noise has been drained away, a standby unit time is set during which no X-rays are emitted and then the detector elements are read. Digital data output from the A/D converter 46 at this point is stored into the memory 49 as noise quantity data for each detector element. The elapsed time (storage time) from the readout of the last X-ray image is counted by the storage time count circuit 50.

When, in such a state, X-rays are actually emitted and an X-ray image is then read out, digital data output from the A/D converter 46 is subjected to subtraction of stored noise quantity data calculated by the operations circuit 48 on the basis of the per-unit-time noise quantity data from the memory 49 and the storage time data from the storage time count circuit 50, thereby producing X-ray-based signal data that is free from dark current noise or fixed pattern noise.

According to the sixth embodiment, therefore, a good X-ray image free from dark current noise can be obtained from read digital data by the provision of the memory 49 that stores per-unit-time noise quantity for each detector element, the storage time count circuit 50 that counts the storage time elapsed from the readout of the last X-ray image, the operations circuit 48 that calculates stored noise quantity data from data on the noise quantity per unit time and the storage time, and the subtracter 47 that subtracts the stored noise quantity data from digital data from the A/D converter 46.

Thus, the sixth embodiment can easily eliminate a problem which arises with the simultaneous elimination of dark current noise from all the detector elements prior to the emission of X-rays. The problem is that the effect of dark current noise changes from line to line in a frame of an X-ray image. This is because the dark current noise level is greater in detected data from the detector elements on the line that is read last than in detected data from the detector elements on the line that is read first. That is, according to the sixth embodiment, the variations in dark current noise level from line to line can be eliminated easily.

A seventh embodiment of the invention will be described with reference to FIG. 17 illustrating a circuit arrangement of a flat panel X-ray detector used in an X-ray imaging apparatus embodying the invention. Following the emission of X-rays, TFT ON pulse signals are output from a gate driver 61 sequentially for each line. Consequently, charges produced by exposure to X-rays and stored on detector elements 63 are read line by line. As described previously, each detector element is composed of a photodiode and a storage capacitor. A mask 64 that blocks X-rays is mounted on the X-ray receiving surfaces of the detector elements arranged in a column (the endmost column) of an array of detector elements 63. The charges output from the detector elements line by line are input, column by column, to integration circuits 65 each comprised of a readout amplifier and a time-constant capacitor (a switch for discharging charge stored on the capacitor is omitted here). The output of the integration circuit for the column on which the mask 64 is mounted is connected to ground (0V) through a voltage divider comprised of a series combination of first and second resistors 66 and 67.

On the other hand, the output of each of the integration circuits for the other connected to the inverting input of an operational amplifier constituting a differential circuit (differential amplifier) 68 through a resistor 69. The junction of the first and second resistors 66 and 67, i.e., the voltage divider output, is connected to the noninverting inputs of the operational amplifiers of the respective differential circuits 68. Each of the differential circuits 68 has its output connected to a respective one of the inputs of a multiplexer 70. The multiplexer sequentially switches the outputs of the differential circuits 68 to its output to thereby produce a serial signal, which is, in turn, input to an A/D converter 71. Thus, the analog serial signal is converted into a digital signal.

In the seventh embodiment thus arranged, when X-rays are emitted to a human body after dark current noise has been drained out of each of the detector elements 63 simultaneously, each detector element with no X-ray blocking mask will store charge corresponding to the amount of incident X-rays, while each detector element with the X-ray blocking mask 64 will store dark current noise charge (including other noises). When the detector elements 63 are read line by line after the termination of the emission of X-rays, charge indicative of dark current noise is output from one of the detector elements in a line that has the mask 64. A voltage signal corresponding to that charge is output from the point between the resistors 66 and 67 and applied to the noninverting inputs of the operational amplifiers of the differential circuits 68. Each of the differential circuits 68 amplifies the difference between the signal corresponding to the dark current noise and a signal corresponding to charge stored on a corresponding detector element in the same line. That is, each differential circuit subtracts a dark current noise signal from the detector element with the mask 64 from an X-ray detect signal from the corresponding detector element without the mask arranged in the same line as the masked detector element. The differential output is then applied to the multiplexer 70.

Thus, according to the seventh embodiment, the same advantages as those of the sixth embodiment can be obtained by providing the mask 64 for shielding detector elements in one column from X-rays and the differential circuits 68 each of which takes a difference between signals from a detector element with the mask and a corresponding detector element without the mask which are both arranged in the same line.

Moreover, in the seventh embodiment, prior to the emission of X-rays dark current noise can be drained away either on a line-by-line basis, on a block-by-block basis, or simultaneously for all the lines. In any case, dark current noise can be removed properly.

Furthermore, the combined use of the sixth and seventh embodiments could achieve higher efficiency in removing dark current noise.

For this reason, the combined use of the first through fifth embodiments prior to the emission of X-rays and the combined use of the sixth and seventh embodiments at the time of readout of X-ray image data after the emission of X-rays could achieve even higher efficiency in removing the effect of dark current noise.

In the above embodiments, the integration circuits, each comprised of a readout amplifier and a time-constant capacitor, are provided on the input side of the multiplexer. This is not restrictive. For example, a single integration circuit may be provided on the output side of the multiplexer. By so doing, the number of integration circuits can be reduced, resulting a simpler circuit arrangement, a decrease in the size of the detector substrate, and a reduction in the manufacturing cost.

The flat panel X-ray detector can be arranged without a multiplexer. That is, the detector may be arranged such that A/D converters are respectively connected to integration circuits and the outputs of the A/D converters are selected sequentially one at a time.

An eighth embodiment of the invention will be described with reference to FIGS. 18, 19 and 20. FIG. 18 illustrates in block diagram form the process of creating an X-ray image in an X-ray imaging apparatus embodying the invention. The X-ray imaging apparatuses of the present embodiment and embodiments to be described later are identical in hardware to the general X-ray imaging apparatus. Thus, the description of hardware is omitted. An flat panel X-ray detector 201 comprises a two-dimensional array of detector elements each composed of a photodiode, a capacitor, and a TFT and a fluorescent layer formed on the array for converting X-rays into light. An analog serial signal for one frame output from the flat panel X-ray detector 201 is entered into an A/D converter 202 where the analog serial signal is converted into digital serial image data. The digital data is stored via a memory controller 203 into a memory unit comprising n frame memories of a first frame memory 204-1, a second frame memory 204-2, a third frame memory 204-3, and so on.

The memory controller 203 is responsive to an X-ray signal indicating whether X-rays are being emitted or not to make a selection among the n frame memories as the destination of collected digital image data. As a method of producing the X-ray signal (timing information), any of the methods described in connection with the third embodiment can be used. When the X-ray signal indicates that no X-rays are emitted, the memory controller 203 stores digital collected data from the A/D converter 202 into the first frame memory 204-1 in such a way that it overwrites old data therein. When the X-ray signal comes to indicate that X-rays are being emitted, with each frame starting with the frame following the frame at that time the destination memory for collected digital data is sequentially changed to the second frame memory 204-2, the third frame memory 204-3, and so on. When the X-ray signal is changed to indicate that no X-rays are emitted, that is, when the emission of X-rays is terminated, the change of the destination memory is repeated up to the frame following a frame at the termination of the X-ray emission. And the destination memory for collected data for the second frame from that frame at the termination of the X-ray emission is returned to the first memory 204-1.

Assume here that the frame memory in which collected data for the frame following the frame at the termination of X-ray emission has been stored is the x-th frame memory. At the termination of writing into the x-th memory, collected data stored in the frame memories from the 1st to the x-th frame memory are summed and then averaged pixel by pixel in the X-ray image creation unit 5, thereby creating a frame of an X-ray image. The resulting X-ray image is output to an output device such as a display or a storage unit such as a hard disk drive.

In the eighth embodiment thus arranged, X-rays are emitted at any time for X-ray imaging while the flat panel X-ray detector 1 is driven continuously and periodically as usual. For example, a description will given of the case where X-rays are emitted for a time interval shorter than one frame period as shown in FIG. 19. Digital data G1 of one frame output from the X-ray detector 201 through the A/D converter 203 at time t21 at which the X-ray emission is started is stored into the first frame memory 204-1. Digital data output from the X-ray detector through the A/D converter at time t22 at which the X-ray emission is terminated is of the same frame as that digital data G1 and hence stored into the first frame memory 204-1. Collected data G2 of the frame following the frame at the termination of the X-ray emission is stored into the second frame memory 204-2. At the termination of writing into the second frame memory 204-2, the X-ray image creation unit 205 sums the data in the first frame memory and the data in the second frame memory and then averages pixel by pixel, thereby producing a frame of an X-ray image. In producing the X-ray image, the averaging is not necessarily required. The same is true of the embodiments which will be described later.

Reference is next made to FIG. 20 to describe the case where X-rays are emitted for a time interval longer than one frame period. At time t23 at which X-ray emission is started, digital data H1 of one frame output from the flat panel X-ray detector 201 through the A/D converter 202 is stored into the first frame memory 204-1 through the memory controller 3.

Collected data H2, H3, H4 and H5 of the following successive frames, during which time X-rays are being emitted, are respectively stored into the second through fifth memories in time sequence.

During the next frame, the emission of X-rays is terminated (time t24). Collected data H6 of that frame is also stored into the sixth memory. Collected data H7 of the frame following the frame during which the emission of X-rays was terminated is stored into the seventh frame memory.

Upon termination of writing of the data H7 into the seventh frame memory, the X-ray image creation unit 205 sums data stored in the first through seventh memories and then averages pixel by pixel to thereby form a frame of an X-ray image. As described previously, the averaging is not necessarily required.

According to the eighth embodiment thus arranged, X-rays can be emitted at any time and for any time interval with the X-ray detector being driven continuously and moreover all effective collected data can be utilized usefully to improve the signal-to-noise ratio in an X-ray image. This owes to the provision of the frame memories 204-1, 204-2, and so on, the memory controller 203 which is responsive to the X-ray timing information to select a different one from the frame memories with each of frames starting with a frame during which time the emission of X-rays is started and ending with the frame subsequent to a frame during which the X-ray emission is terminated to thereby allow collected data of each frame to be stored into a respective one of the frame memories, and the X-ray image creation unit 205 which sums data in each frame memory and averages on a pixel-by-pixel basis to produce an X-ray image.

A ninth embodiment of the invention will be described with reference to FIG. 22. Analog collected data for one frame output from a flat panel X-ray detector 211 is input to an A/D converter 212 where it is converted to a digital form. The digital data is applied via an adder 213 to a main memory 214 where it is stored in such a way as to overwrite old data therein. In response to an X-ray timing signal indicating X-rays are being emitted, the adder 213 adds collected data read from the main memory 214 and collected data output from the A/D converter 212 pixel by pixel and then supplies the results to the main memory 214 for storage therein.

That is, when the X-ray timing signal indicates that no X-rays are emitted, the main memory 214 is not read from and the adder sends collected data from the A/D converter 212 to the main memory 214 as it is. When the X-ray timing signal comes to indicate that X-rays are being emitted, collected data is read from the memory 214 and then added to collected data from the A/D converter 212 pixel by pixel. The results are stored into the main memory 214. When the X-ray signal is changed to indicate that no X-rays are emitted, that is, when the X-ray emission is terminated, the above operations are repeated until the frame following a frame during which the X-ray emission is terminated is reached. Upon termination of writing into the main memory for the frame following the frame at the termination of X-ray emission, collected data stored in the main memory is averaged pixel by pixel in the X-ray image creation unit 215 to produce an X-ray image, which, in turn, is output to an output device such as a display or a storage unit such as a hard disk drive.

In the ninth embodiment thus arranged, X-ray imaging is performed by emitting X-rays at any time with the flat panel X-ray detector 211 continuously driven at regular intervals. Referring now back to FIG. 19, X-ray imaging will be described for the case where X-rays are emitted for a time interval shorter than one frame period. At time t1 at which X-ray emission is started, digital data G1 of one frame output from the X-ray detector 211 through the A/D converter 212 is stored in the main memory 214 as it is. At time t22 at which the X-ray emission is terminated as well, digital collected data output from the X-ray detector through the A/D converter, which is digital data G1 of the same frame, is stored into the main memory 214 as it is. Collected data G2 of the frame following a frame at the termination of X-ray emission is added in the adder 213 to the collected data (G1) read from the main memory pixel by pixel and the results are stored into the main memory. Upon termination of writing the sum of the collected data G1 and G2 into the main memory, the X-ray image creation unit 15 performs the averaging process on the resultant data stored in the main memory for each pixel to thereby produce an X-ray image.

Reference will next be made to FIG. 20 to describe X-ray imaging for the case where the X-ray emission interval is longer than one frame period. In one frame during which the X-ray emission is started at time t23, digital collected data H1 output from the X-ray detector 211 through the A/D converter 212 is stored into the main memory 214 as it is.

In the subsequent frames during which time X-rays are being emitted, collected data H2, H3, H4, and H5 are sequentially output from the X-ray detector through the A/D converter. The collected data H2 is added in the adder 213 to the collected data H1 and the result H1+H2 is stored into the main memory. The collected data H3 is added to the data H1+H2 read from the main memory and the result H1+H2+H3 is stored in the main memory. The collected data H4 is added to the data H1+H2+H3 read from the main memory and the result H1+H2+H3+H4 is stored in the main memory. The collected data H5 is added to the data H1+H2+H3+H4 read from the main memory and the result H1+H2+H3+H4+H5 is stored in the main memory.

In the next frame, the X-ray emission is terminated (time t24). Collected data H6 of this frame is also added to the data H1+H2+H3+H4+H5 read from the main memory and the result is stored into the main memory. In the frame subsequent to the frame at the termination of X-ray emission, collected data H7 is also added to the data H1+H2+H3+H4+H5+H6 read from the main memory and the result is stored into the main memory.

Upon termination of writing into the main memory 214 for the collected data H7, the X-ray image creation unit 215 performs the averaging process on the data stored in the main memory for each pixel to thereby produce an X-ray image.

Thus, the ninth embodiment can provide the same advantages as the eighth embodiment by the provision of the adder 213 which is responsive to an X-ray timing signal to add collected data in successive frames starting with a frame at the start of X-ray emission and ending with the frame subsequent to a frame at the termination of X-ray emission in a sequential order of time through the use of the main memory 214 and the X-ray image creation unit 215 which averages the accumulative data stored in the main memory pixel by pixel to produce an X-ray image. In addition, only one main memory is required and the X-ray image creation unit is merely required to perform an averaging process. Thus, the memory capacity required can be reduced and the burden of processing imposed on the X-ray image creation unit can be alleviated.

A tenth embodiment of the invention will be described with reference to FIG. 23. An analog signal corresponding to one frame output from a flat panel X-ray detector 221 is applied to an A/D converter 222 where it is converted to a digital signal, which, in turn, is stored via a memory controller 223 into a first frame memory 224-1 or a second frame memory 224-2.

When an X-ray signal comes to indicate that X-rays are being emitted, i.e., when the emission of X-rays is started, a gate driver 221-1 stops the reading from the X-ray detector from the frame subsequent to a frame at the start of X-ray emission. When the X-ray signal is changed to indicate that X-rays are no longer emitted, i.e., when the X-ray emission is terminated, the gate driver restarts the reading from the X-ray detector from the frame following the frame at the termination of the X-ray emission.

During the time interval when the reading from the X-ray detector is stopped by the gate driver, each detector element in the X-ray detector continues to store charge according to the amount of incident X-rays.

In response to the X-ray signal, the memory controller 223 changes the destination frame memory for collected digital data. That is, when the X-ray signal indicates that X-rays are not emitted, the memory controller 223 supplies input digital data from the A/D converter 222 to the first frame memory 224-1 where it is stored in such a way as to overwrite old data therein.

When the X-ray signal is changed to indicate that X-rays are being emitted, i.e., when X-ray emission is started, collected data of the frame following a frame at the start of X-ray emission begins to be stored into the second frame memory 224-2. In the second memory as well, old data is overwritten by the latest data.

When the X-ray signal is changed to indicate that the X-rays are no longer emitted, i.e., when the X-ray emission is terminated, collected data of up to the frame following the frame at the termination of X-ray emission are written into the second frame memory 224-2. Collected data of the further following frame is written into the first frame memory 224-1.

Upon termination of writing into the second frame memory 224-2, the collected data stored in the first and second frame memories 224-1 and 224-2 are summed and then averaged pixel by pixel by the X-ray image creation unit 225 to produce an X-ray image. The resulting X-ray image is output to an output device such as a display or a storage unit such as a hard disk drive.

In the tenth embodiment thus arranged, X-ray imaging is performed by emitting X-rays at any time with the flat panel X-ray detector 211 continuously driven at regular intervals. Referring now to FIG. 24, X-ray imaging will be described for the case where X-rays are emitted for a time interval longer than one frame period. The X-ray imaging in which the X-ray emission time interval is shorter than one frame period is the same as in the eighth embodiment and hence the description thereof is omitted.

Digital collected data I1 of a frame at time t25 at which X-ray emission is started is stored into the first frame memory 224-1 via the memory controller 223. The gate driver 221-1 stops reading from the flat panel X-ray detector 221 from the frame following the frame at time t25. In this embodiment, the A/D converter 222 is in synchronism with the X-ray detector 221. Thus, when the reading from the X-ray detector is stopped, the operation of A/D converter is also stopped, and when the reading from the X-ray detector is restarted, the operation of the A/D converter is also restarted.

When, at time t26, the X-ray emission is terminated, the gate driver 221-1 restarts the flat panel X-ray detector 221 from the frame following the frame at time t25. On restart, the X-ray detector 221 and the A/D converter 222 output a frame of digital collected data I2 of that frame, which is stored into the second frame memory 224-2 via the memory controller 223.

Upon termination of the writing of the digital data I2 into the second frame memory 224-2, the X-ray image creation unit 225 sums the collected data stored in the first and second frame memories and then averages pixel by pixel, thereby producing an X-ray image.

According to the tenth embodiment thus arranged, X-rays can be emitted for a desired time interval at any time with the flat panel X-ray detector 1 driven continuously and a correct X-ray image can be obtained by the provision of a gate driver 221-1 which is responsive to a X-ray timing signal to stop the operation of the X-ray detector from the frame following a frame at the start of the X-ray emission and restart the operation of the X-ray detector from the frame following a frame at the termination of the X-ray emission, first and second frame memories, a memory controller responsive to the X-ray timing signal to write collected data of a frame at the start of X-ray emission into the first frame memory and write collected data of the frame following the frame at the termination of the X-ray emission into the second frame memory, and an X-ray creation unit which sums the collected data stored in the first and second frame memories pixel by pixel and averages each sum to thereby produce an X-ray image.

Moreover, according to the tenth embodiment, data required to produce an X-ray image can be obtained from the X-ray detector in two read operations. This helps reduce read-operation-dependent noise. Thus, an X-ray image having less noise can be obtained. Furthermore, the number of times the addition is performed is reduced, allowing the burden of processing imposed on the X-ray creation unit to be reduced.

Reference will be made to FIG. 24 to describe an eleventh embodiment of the invention. An analog collected signal (serial signal) for one frame output from a flat panel X-ray detector 231 is entered into an A/D converter 232 where it is converted to digital data. The digital data is applied via a memory controller 233 to a memory unit comprising multiple frame memories 234-1, 234-2, 234-3, etc.

A gate driver 231-1 is responsive to an X-ray signal from a mode decision unit 235 to control the reading from the flat panel X-ray detector 231. When the X-ray signal comes to indicate that X-rays are being emitted, i.e., when the X-ray emission is started, the gate driver stops the reading from the X-ray detector from the frame following a frame at the start of X-ray emission. When the X-ray signal is changed to indicate that X-rays are no longer emitted, the gate driver restarts the reading from the X-ray detector from the frame following a frame at the termination of X-ray emission.

During a time interval when the reading from the X-ray detector 231 is stopped by the gate driver 231-1, each detector element in the detector continues to store charge according to the amount of incident X-rays.

In this embodiment, the A/D converter 232 is in synchronism with the X-ray detector 231. Thus, when the reading from the X-ray detector is stopped, the operation of the A/D converter is also stopped, and when the reading from the X-ray detector is restarted, the operation of the A/D converter is also restarted.

The memory controller 233 responds to the X-ray signal from the mode decision unit to change the destination frame memory for digital collected data. When the X-ray signal indicates that no X-rays are emitted, the memory controller 233 sends digital collected data from the A/D converter 232 to the first frame memory 234-1 where it is stored in such a way as to overwrite old data.

When the X-ray signal comes to indicate that X-rays are being emitted, the memory controller 233 changes the destination frame memory for collected data for one frame output from the A/D converter 232 with each of successive frames starting with the frame following a frame at the start of X-ray emission in the order of the second frame memory 234-2, the third frame memory 234-3, etc.

When the X-ray signal is changed to indicate that X-rays are no longer emitted, the memory controller continues the change of the destination memory until the frame following a frame at the termination of X-ray emission is reached. And then the memory controller returns the destination memory to the first frame memory.

Assume here that the frame memory in which collected data of the frame following a frame at the termination of X-ray emission has been stored is the x-th frame memory. At the termination of the writing into the x-th frame memory, the data stored in the first through x-th memories are summed and averaged pixel by pixel by the X-ray image creation unit 236, whereby an X-ray image is created. The resulting X-ray image is output to an output device such as a display or a storage unit such as a hard disk drive.

On the basis of a manual switch (not shown) for switching between the mode in the first embodiment and the mode in the third embodiment, the used amount of X-rays, or a body region to be imaged, the mode decision unit 235 applies the X-ray signal to only the memory controller 233 or to both the memory controller 233 and the gate driver 231-1.

In the eleventh embodiment thus arranged, when the first embodiment mode is set by the manual switch, or the used amount of X-rays is large, or imaging is performed on a body region needing a large amount of X-rays, the mode decision unit 235 supplies the X-ray signal only to the memory controller 233.

Thus, as in the eighth embodiment, collected data is stored in a different frame memory with each of successive frames starting with a frame at the start of X-ray emission and ending with the frame following a frame at the termination of X-ray emission and the data stored in each frame memory are summed and averaged pixel by pixel, whereby an X-ray image is produced.

On the other hand, when the ninth embodiment mode is set by the manual switch, or the used amount of X-rays is small, or imaging is performed on a body region that needs a small amount of X-rays, the mode decision unit 235 supplies the X-ray signal to the gate driver 231-1 as well as the memory controller 233.

Thus, as in the ninth embodiment, collected data of a frame at the start of X-ray emission is stored into the first frame memory 234-1. The driving of the X-ray detector 231 and the A/D converter 232 is stopped for a time interval which elapses from the next frame to the time when the X-ray emission is terminated. The driving of the X-ray detector and the A/D converter is restarted from the frame following a frame at the termination of X-ray emission and collected data of the restarting frame is stored into the second frame memory 234-2. The collected data stored in the first and second frame memories are summed and averaged pixel by pixel to thereby produce an X-ray image.

According to the eleventh embodiment thus arranged, optimum imaging according to operator's requests, the amount of X-rays to be used, or imaging body regions can be performed by the provision of the mode decision unit 235 for switching between the imaging methods of the eighth and ninth embodiments. Consequently, the eleventh embodiment can provide the same advantages as the eighth embodiment adapted to allow the signal- to-noise ratio to be improved or the tenth embodiment adapted to allow noise to be reduced.

The present invention is not limited to the above described embodiments various changes and modifications can be made within the spirit and scope of the invention. For example, in the embodiments, the direct conversion type of planar detector is exemplified. However, the present invention can be applied to the indirect conversion type of planar detector.

As described above in detail, according to the invention, an X-ray imaging apparatus is provided which is improved in operability and little influenced by dark current noise to thereby allow good X-ray images to be produced.

In addition, an X-ray imaging apparatus is provided which permits X-rays to be emitted for a desired time interval at any time with the flat panel X-ray detector driven continuously and moreover good X-ray images to be produced.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. An X-ray imaging apparatus comprising:

X-ray emission means for emitting X-rays onto a human body under examination;

X-ray emission control means for outputting an X-ray emission signal to direct said X-ray emission means to emit said X-rays;

a flat panel X-ray detector having a two-dimensional array of detector elements in lines and columns, each of said detector elements converts incident X-rays passed through said human body under examination into an electric signal and stores the electrical signal; and readout control means for controlling readout of electric signals stored on said detector elements of said flat panel X-ray detector;

wherein said readout control means places said lines of said detector elements in the readout state at the same time to discharge electric signals stored on said detector elements, then places all the lines of said detector elements in the nonreadout state to allow each of said detector elements to store an electric signal; and finally places each line of said detector elements in the readout state in sequence to allow the electric signal stored on each of said detector elements to be read.

2. The X-ray imaging apparatus according to claim 1, wherein said readout control means places all of the lines of the detector elements in the readout state at the same time.

3. The X-ray imaging apparatus according to claim 1, wherein said readout control means comprises:

reset means for performing a resetting operation until said X-ray emission signal is output; and storing means for performing a storage operation when said X-ray emission signal is output.

4. The X-ray imaging apparatus according to claim 1, wherein said flat panel X-ray detector comprises:

an X-ray sensor on its X-ray receiving surface, and said readout control means is responsive to an output of said X-ray sensor to switch operations of said readout control means.

5. The X-ray imaging apparatus according to claim 1, wherein said X-ray emission control means comprises:

output means for outputting said X-ray emission signal in response to an input to an X-ray emission switch which directs said X-ray emission means to emit said X-rays.

6. The X-ray imaging apparatus according to claim 1, wherein each of said X-ray detector elements comprises:

X-ray-to-light conversion means for converting said X-rays into visible light;

light-to-electric conversion means for converting the light into said electric signal; and storage means for storing the electric signal from said light-to-electric conversion means in the form of a charge.

7. The X-ray imaging apparatus according to claim 1, wherein each of said X-ray detector elements comprises;

X-ray-to-electric conversion means for converting said X-rays into said electric signal, and storage means for storing the electric signal from said X-ray-to-electric conversion means in the form of a charge.

8. The X-ray imaging apparatus according to claim 1, wherein said flat panel X-ray detector includes:

integration circuits which integrate electric signals output from said detector elements; and reset circuits which reset said integration circuits.

9. The X-ray imaging apparatus according to claim 1, further comprising:

compensation means for removing a dark current noise from the electric signal from each of said detector elements.

10. The X-ray imaging apparatus according to claim 1, wherein said flat panel X-ray detector comprises masked detector elements that will not store electric charges at the time of incidence of X-rays, and said X-ray imaging apparatus further comprises compensation means for removing a dark current noise from said electric signals on the basis of outputs of said masked detector elements.

11. The X-ray imaging apparatus according to claim 1, wherein said X-ray emission means includes;

start means for starting the emission of X-rays immediately after a reset operation of said readout control means terminates.

12. The X-ray imaging apparatus according to claim 1, wherein said readout control means includes:

reset means for performing a reset operation at the same time the emission of X-rays is started by said X-ray emission means.

13. An X-ray imaging apparatus comprising:

X-ray emission means for emitting X-rays onto a human body under examination;

X-ray emission control means for outputting an X-ray emission signal which directs said X-ray emission means to emit said X-rays;

a flat panel X-ray detector having a two-dimensional array of detector elements in lines and columns, each of said detector elements converts incident X-rays passed through said human body under examination into an electric signal and stores the electrical signal;

readout means for reading out said electric signals from said detector elements in sequence and generating a frame signal representative of a frame; and X-ray image producing means for producing an X-ray image by adding frame signals the first of which represents the frame obtained at the start of the emission of X rays and the last of which represents the frame after the frame obtained at the termination of the emission of X rays.

14. The X-ray imaging apparatus according to claim 13, wherein each of said X-ray detector elements comprises:

X-ray-to-light conversion means for converting said X-rays into light;

light-to-electric conversion means for converting the light into said electric signal; and storage means for storing the electric signal from said light-to-electric conversion means in the form of a charge.

15. The X-ray imaging apparatus according to claim 13, wherein each of said X-ray detector elements comprises:

X-ray-to-electric conversion means for it converting said X-rays into said electric signal; and storage means for storing the electric signal from said X-ray-to-electric conversion means in the form of a charge.

16. An X-ray imaging apparatus comprising:

X-ray emission means for emitting X-rays onto a human body under examination;

X-ray emission control means for outputting an X-ray emission signal which directs said X-ray emission means to emit said X-rays;

a flat panel X-ray detector having a two-dimensional array of detector elements in lines and columns, each of said detector elements converts incident X-rays passed through said human body under examination into an electric signal and stores the electric signal;

readout means for reading in a sequence from said detector elements of all electric signals other than those representing frames after the frame obtained at the start of the emission of X-rays and before the frame obtained at the termination of the emission of X-rays;

X-ray image producing means for adding a frame signal representing the frame obtained at the start of the emission of X-rays and frame signals representing the frames obtained after the termination of the emission of X-rays and for producing an X-ray image by summing electric signals read by said readout means during the frame at the start of the emission of X-rays and during the frame following the frame at the termination of the emission of X-rays; and readout stopping means for stopping said readout means from reading electric signals from each of said detector elements during successive frames from the frame following a frame at the start of the emission of X-rays to a frame at the termination of X-rays.

17. The X-ray imaging apparatus according to claim 16, wherein each of said X-ray detector elements comprises:

X-ray-to-light conversion means for converting said X-rays into light, light-to-electric conversion means for converting the light into said electric signal, and storage means for storing the electric signal from said light-to-electric conversion means in the form of charge data.

18. The X-ray imaging apparatus according to claim 16, wherein each of said X-ray detector elements comprises:

X-ray-to-electric conversion means for converting said X-rays into said electric signal, and storage means for storing the electric signal from said X-ray to-electric conversion means in the form of charge data.

19. An X-ray imaging apparatus comprising:

X-ray emission means for emitting X-rays onto a human body under examination;

X-ray emission control means for outputting an X-ray emission signal which directs said X-ray emission means to emit said X-rays;

a flat panel X-ray detector having a two-dimensional array of detector elements in lines and columns, each of said detector elements converts incident X-rays passed through said human body under examination into an electric signal and stores the electric signal;

readout means for reading out electric signals from said detector elements in sequence and generating a frame signal representing a frame;

mode-selecting means for selecting a first mode or a second mode; and

X-ray image producing means for producing an X-ray image by adding frame signals;

wherein when the first mode is selected, said readout means reads out electric signals from said detector elements in sequence and generates a frame signal representing a frame, and said X-ray image producing means adds frame signals the first of which represents the frame obtained at the start of the emission of X-rays and the last of which represents the frame next to the frame obtained at the termination of the emission of X-rays; and wherein when the second mode is selected, said readout means reads in sequence from said detector elements all electric signals other than those representing frames after the frame obtained at the start of the emission of X-rays and before the frame obtained at the termination of the emission of X-rays, and said X-ray image producing means adds a frame signal representing the frame obtained at the start of the emission of X-rays and frame signals representing the frames obtained after the termination of the emission of X-rays.

20. The X-ray imaging apparatus according to claim 19, wherein each of said X-ray detector elements comprises:

X-ray-to-light conversion means for converting said X-rays into light;

light-to-electric conversion means for converting the light into an electric signal; and storage means for storing the electric signal from said light-to-electric conversion means in the form of a charge.

21. The X-ray imaging apparatus according to claim 19, wherein each of said X-ray detector elements comprises:

X-ray-to-electric conversion means for converting said X-rays into an electric signal; and storage means for storing the electric signal from said X-ray-to-electric conversion means in the form of a charge.

* * * * *